Oct. 18, 1955 H. J. PRICE 2,720,740
ROTARY COTTON TOPPER
Filed June 7, 1954 2 Sheets-Sheet 2
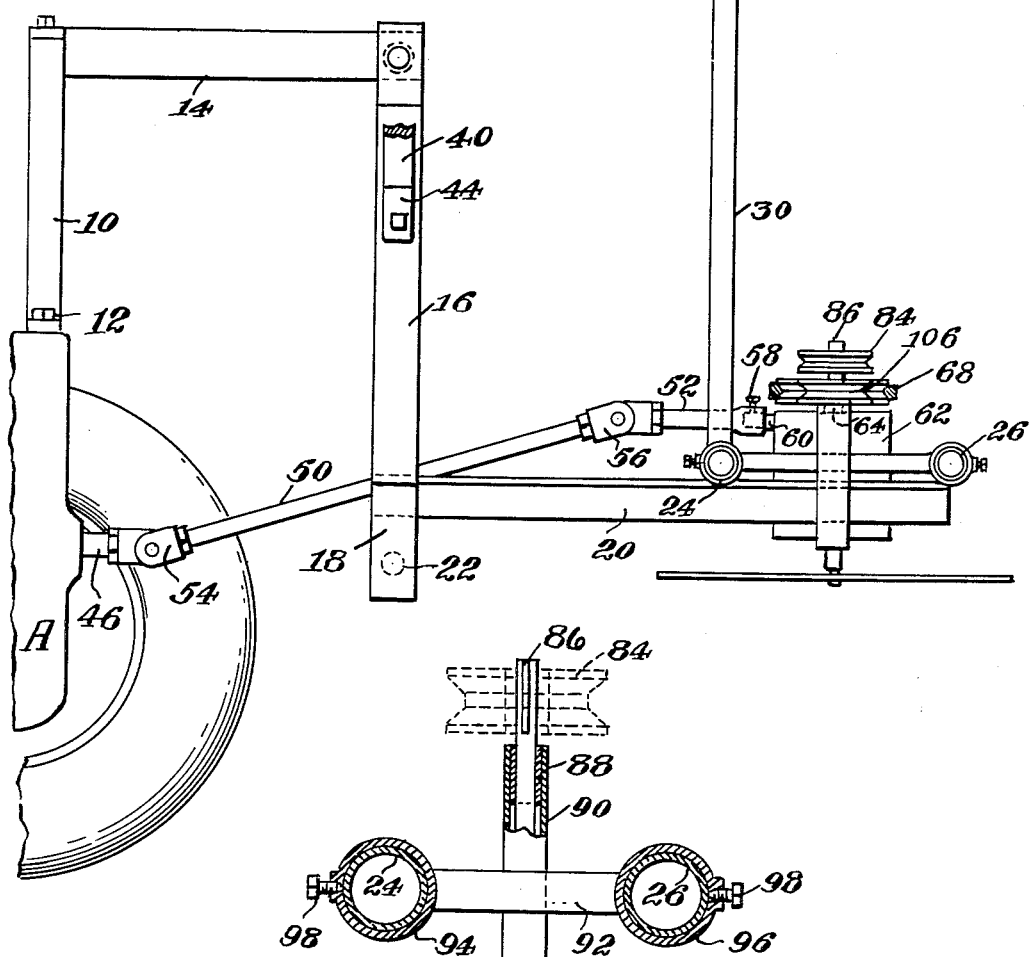
INVENTOR.
HOWELL J. PRICE.
BY
Mason, Mason & Sheridan
Attorneys.

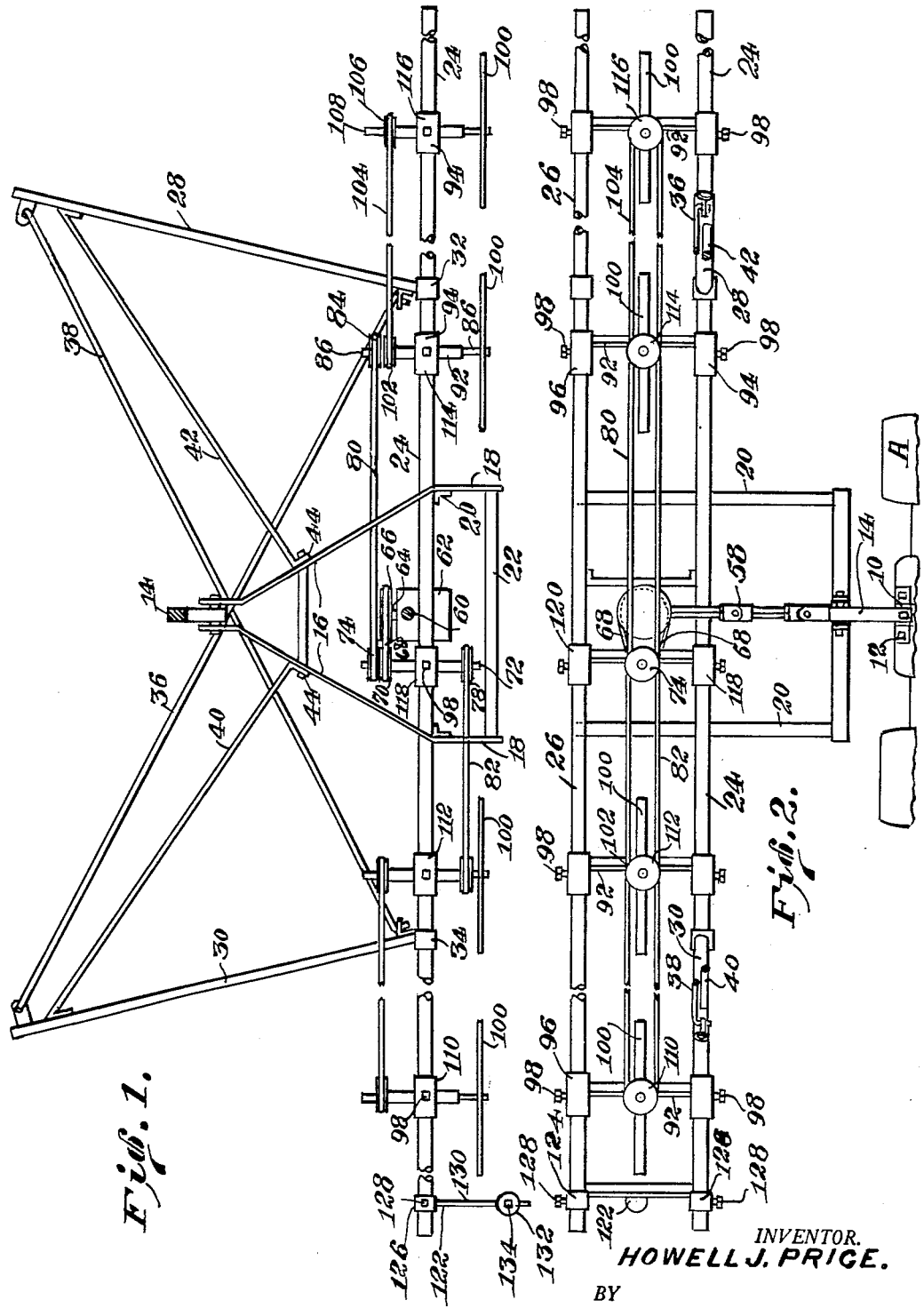

United States Patent Office 2,720,740
Patented Oct. 18, 1955

2,720,740
ROTARY COTTON TOPPER
Howell Judson Price, Canyon, Tex.

Application June 7, 1954, Serial No. 434,870

6 Claims. (Cl. 56—25.4)

This invention relates to a rotary cotton topper for topping growing cotton plants.

An object of the invention is to provide a cotton topper for simultaneously cutting the tops from a plurality of growing cotton plants by means of rotary cutting mechanism mounted on a tractor which moves up and down the rows of plants.

Another object is to provide novel means for supporting the topping mechanism from a conventional tractor.

A further object is the mechanism for topping cotton which includes a plurality of spaced flying cutters.

Yet another object is to provide adjustable means for readily adjusting the spacing of a plurality of rotary cutters along a horizontal support whereby to adjust the cutting mechanism with relation to the path of travel of the tractor upon which said cutters are mounted.

Other objects will appear hereinafter throughout the specification.

In the drawings:

Figure 1 is an elevational view of the cotton topping mechanism with the supporting bar and the power take-off shaft shown in section, Figure 2 is a top plan view similar to Figure 1, but additionally showing the mounting of the mechanism on a tractor;

Figure 3 is an enlarged side elevational view of the mechanism shown in Figure 2; and Figure 4 is a side elevational enlarged view, partly in section, of one of the individual cutter driving units.

As shown in Figure 3, wherein the cotton topper mechanism takes the form of an attachment to a tractor, numeral 10 is a vertical standard which is attached by means of a bolt or bolts 12 to the rear end of a tractor A. Mounted on the standard 10 and extending horizontally rearwardly therefrom is a supporting bar 14 and extending downwardly from this bar are a pair of diverging arms 16, as shown particularly in Figure 1. These arms have straight portions 18 which support angle irons 20 that form part of the supporting framework. The angle irons are spaced from each other by means of pipe 22, as shown in Figures 1 and 3.

Extending sidewise from the angle iron members are a pair of transversely extending spaced pipes 24 of standard construction, attached by welding to said pipes.

As shown particularly in Figures 1 and 3, pairs of brace members 28 and 30 are mounted on collars 32 and 34, respectively, which may be adjustably fixed along pipe 24. Each brace member is provided with a diagonal brace rod 36 and 38 which connect the upper end of one brace rod to the lower end of the other brace rod, see Figure 1.

The other member of each pair of brace members is comprised of secondary brace rods 40 and 42 which are provided with feet 44 by which they are connected to the pair of diverging arms 16, and the upper end of each secondary brace rod is connected adjacent the upper end of each of the brace members 28, 30.

Extending rearwardly from the tractor is a power take-off shaft 46 consisting of sections 50 and 52 connected to each other by means of a pair of universal joints 54 and 56. Forward section 52 is provided with coupling means 58 whereby it may be coupled to drive shaft 60 which extends into casing 62 which forms part of a right angle drive means, the other shaft of which is indicated at 64. Shafts 60 and 64 are connected to each other by spur gears, not shown, within casing 62, preferably by a one-to-one ratio, although other gear ratios may be used.

Mounted on the top of shaft 64 is the drive pulley 66, as shown in Figure 1, which is connected by a V-belt drive including belt 68 to drive through driven pulley 70 mounted on shaft 72. The upper and lower ends of this shaft are provided with driving pulleys 74 and 78 which drive V-belts 80 and 82, respectively. Belt 80 drives pulley 84 which is mounted in suitable bearings 88 within housing 90, as shown in Figure 4. This housing is welded to cross member 92, whose ends are welded to the short pipe sections 94 and 96 that encircle transversely extending pipes 24 and 26, respectively. These sections are adjustable along the length of the pipes by means of the clamping screws 98.

The lower end of shaft 86 supports the flying cutter 100, shown in Figure 1, but omitted from Figure 4.

Shaft 86 also drives pulley 102 and this pulley drives belt 104 that is drivingly connected with driven pulley 106, which latter is mounted on shaft 108. Each of the flying cutter units includes drive shafts and pulleys, bearings, short pipe sections and other parts, which are similar, except that the two inside units are each provided with a pair of pulleys while the outside units only are provided with a single driven pulley.

For purposes of identification these units are designated as seen in Figures 1 and 2 by the numerals 110, 112, 114 and 116. Each unit is independently adjustable along the transversely extending pipes 24, 26 and each may be held in adjusted position by means of the screws 98.

It will be appreciated, therefore, that it is only necessary in order to adjust all of the units with relation to the line of travel of the tractor or to adjust any unit with relation to any other unit, to merely release one or more pairs of the short pipe sections 94, 96 to adjust that particular unit.

Such adjustment may be necessary in order to adjust the tension of any one of the V-belts which drive the units. It will also be possible to adjust the tension of drive belt 68 by moving or loosening screws 98 of the short pipe sections 118, 120 which support shaft 72 on pipes 24, 26. When this adjustment has been made the proper adjustment is made for flying cutter units 112 and 114, following which the adjustment is effected for flying cutter units 110 and 116.

Mounted adjacent at least one end of the transversely extending pipes 24, 26 is a stabilizer 122, having short pipe sections 124, 126, which slides on said pipes 24, 26. An adjustment may be made along the length of said pipes by means of screws 128 which latter are duplicates of screw 98. Suspended below pipes 24, 26 on said stabilizer is an arm 130 whose lower end supports a weight 132 which is adjustable vertically along the length of said arm by means of a screw 134 which upon tightening will engage the arm 130 at any adjustable position from another.

Adjustment is made transversely of the movement of the tractor by substituting a different length belt for belt 68, whereupon each of the units 110, 112, 114, 116 may move to a new adjusted position. In addition to the belt tightening feature the units 110, 112, 114, 116 may be accomplished by using a belt of a longer or shorter length than belt 104, shown in Figures 1 and 2.

The support of the cutter mechanism from the tractor in a single vertical plane, as shown in Figures 2 and 3, allows the cutters to tilt or adjust themselves about supporting bar 14 as a pivot, to a certain extent.

I claim:

1. A rotary cotton topper comprising an elongated frame having at least one pair of spaced longitudinally extending members, supporting means on said frame intermediate the ends thereof for supporting said frame from a mobile vehicle, power operated means on said frame, at least two members on said frame interconnecting said longitudinal members and adjustable therealong, a substantially perpendicular rotary shaft mounted on each of said interconnecting members, each of said shafts having a cutter on its lower end and a pulley means on its upper end, and drive means interconnecting said power operated means and said pulley means.

2. A rotary cotton topper comprising an elongated frame having at least one pair of spaced longitudinally extending members, supporting means on said frame intermediate the ends thereof for supporting said frame from a mobile vehicle, power operated means on said frame, at least two members on said frame interconnecting said longitudinal members and adjustable therealong, a substantially perpendicular rotary shaft mounted on each of said interconnecting members, each of said shafts having a cutter on its lower end and a pulley means on its upper end, and drive means interconnecting said power operated means and said pulley means, said drive means including a power take-off shaft extending rearwardly of said spaced members and at substantially right angles thereto.

3. A rotary cotton topper comprising an elongated frame having at least one pair of spaced longitudinally extending members, supporting means on said frame intermediate the ends thereof for supporting said frame from a mobile vehicle, power operated means on said frame, at least two members on said frame interconnecting said longitudinal members and adjustable therealong, a substantially perpendicular rotary shaft mounted on each of said interconnecting members, each of said shafts having a cutter on its lower end and a pulley means on its upper end, and drive means interconnecting said power operated means and said pulley means, said spaced longitudinal members comprising a pair of parallel pipes.

4. A rotary cotton topper comprising an elongated frame having at least one pair of spaced longitudinally extending members, supporting means on said frame intermediate the ends thereof for supporting said frame from a mobile vehicle, power operated means on said frame, at least two members on said frame interconnecting said longitudinal members and adjustable therealong, a substantially perpendicular rotary shaft mounted on each of said interconnecting members, each of said shafts having a cutter on its lower end and a pulley means on its upper end, and drive means interconnecting said power operated means and said pulley means, said spaced longitudinal members comprising a pair of parallel pipes, and means for retaining said interconnecting members in adjusted position on said parallel pipes comprising clamping screw means.

5. A rotary cotton topper comprising an elongated frame having at least one pair of spaced longitudinally extending members, supporting means on said frame intermediate the ends thereof for supporting said frame from a mobile vehicle, power operated means on said frame, at least two members on said frame interconnecting said longitudinal members and adjustable therealong, a substantially perpendicular rotary shaft mounted on each of said interconnecting members, each of said shafts having a cutter on its lower end and a pulley means on its upper end, and drive means interconnecting said power operated means and said pulley means, said supporting means on said frame including a pair of diverging arms, bar means connecting said arms to a vehicle, and means connecting said diverging arms to said longitudinal members.

6. A rotary cotton topper comprising an elongated frame having at least one pair of spaced longitudinally extending members, supporting means on said frame intermediate the ends thereof for supporting said frame from a mobile vehicle, power operated means on said frame, at least two members on said frame interconnecting said longitudinal members and adjustable therealong, a substantially perpendicular rotary shaft mounted on each of said interconnecting members, each of said shafts having a cutter on its lower end and a pulley means on its upper end, drive means interconnecting said power operated means and said pulley means, said supporting means on said frame including a pair of diverging arms, bar means connecting said arms to a vehicle, means connecting said diverging arms to said longitudinal members, diagonal brace rods, and brace members, said brace rods connecting said brace members to said diverging members.

References Cited in the file of this patent

UNITED STATES PATENTS

| | | |
|---|---|---|
| 2,489,204 | Sprick et al. | Nov. 22, 1949 |
| 2,578,963 | Bell | Dec. 18, 1951 |
| 2,681,536 | Kuhary et al. | June 22, 1954 |
| 2,682,740 | Miller et al. | July 6, 1954 |